A. AMMENTORP.
FIRE EXTINGUISHER.
APPLICATION FILED DEC. 2, 1908.
950,778.
Patented Mar. 1, 1910.
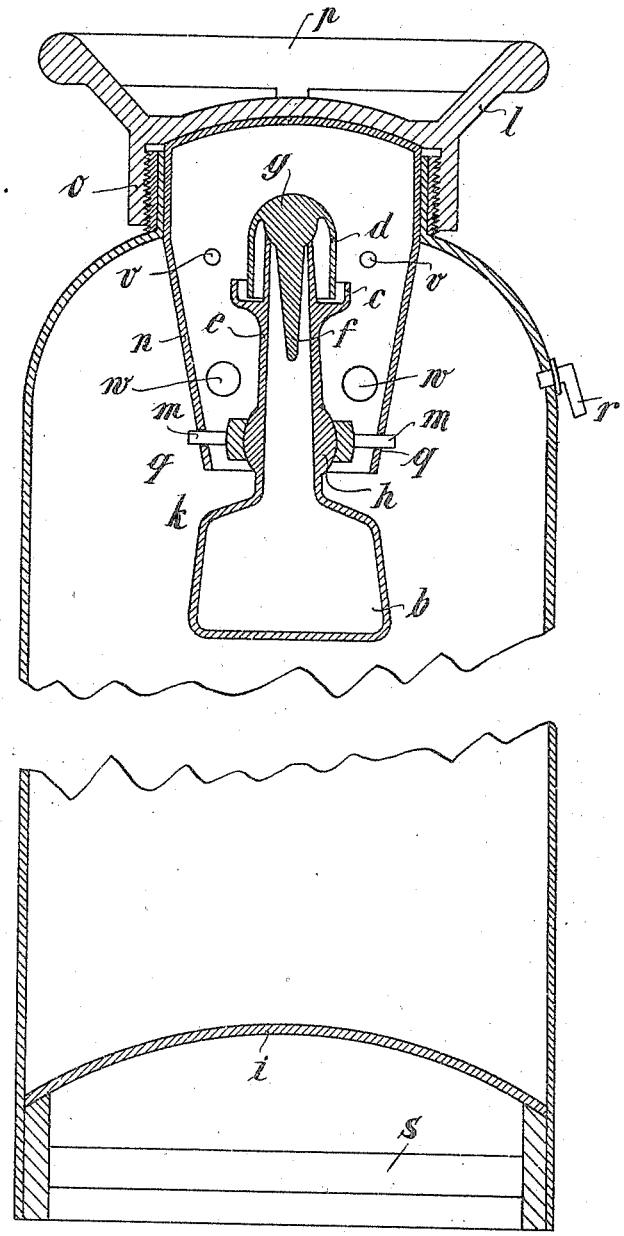
Witnesses:
C. C. Mann
Horace G. Deity
Inventor,
Anders Ammentorp,
by Rosenbaum & Stockbridge
Attys.

UNITED STATES PATENT OFFICE.

ANDERS AMMENTORP, OF ALTONA, GERMANY, ASSIGNOR TO CARL DIEDERICHS, OF HAMBURG, GERMANY.

FIRE-EXTINGUISHER.

950,778.  Specification of Letters Patent.  Patented Mar. 1, 1910.

Application filed December 2, 1908. Serial No. 465,748.

*To all whom it may concern:*

Be it known that I, ANDERS AMMENTORP, a subject of the King of Denmark, residing at Altona, in the Empire of Germany, have invented a new and useful Fire-Extinguisher, of which the following is a specification.

My invention relates to fire-extinguishers of that kind, in which bottles containing water and certain chemicals are so arranged that at the proper moment the chemicals are allowed to act upon each other for producing a high pressure which forces the liquid out of the bottle.

The known fire-extinguishers of this kind present various defects. Some of the fire-extinguishers are actuated in the manner that certain inner parts are destroyed from without for permitting the chemicals to mix together. Other fire-extinguishers are dangerous for the reason, that vibrations or violent shocks, to which they are frequently exposed, may cause the chemicals to inadvertently mix and thus produce an undesired extrusion of the liquid.

My invention consists of improvements in such fire-extinguishers, whereby the said defects are avoided. The bottle is provided with a cover which is adapted to serve as a base at the moment, that the bottle is turned with its bottom upward for actuating the fire-extinguisher. A mantle slightly tapering downward is suspended from the cover and is adapted to support at its lower open end an acid bottle by means of a universal joint in such a manner, that the acid bottle is by its own weight caused to place itself in a vertical position and to at once return to the same, should the bottle be shaken during the transport. The mantle serves for keeping off from the acid bottle most of the splashing liquid, should the latter be violently agitated at the top of the bottle during the transport. The acid bottle is moreover provided with an annular cup on its neck and with a stopper, which by its special construction is adapted to form with the cup a water-seal and to automatically return to its normal position during the shake of the bottle and to open on the bottle being inverted while not leaving the neck.

I will now proceed to describe my invention with reference to the accompanying drawing, which represents a vertical longitudinal section through an improved fire-extinguisher in a mode of execution, an intermediate part being broken away.

The fire-extinguisher comprises a bottle $a$ of any suitable shape and a cover $l$, which is adapted to be made air- and water-tight on its neck $o$ by means of a screw-thread as shown or in any other known manner. The cover $l$ is shown as made in one piece with a hand-wheel $p$, which by reason of its shape is adapted to serve as a base, when the bottle $a$ is inverted. The bottom $i$ of the bottle is preferably disposed at a certain height above the lower edge of the bottle $a$ and in the space so formed a handle $s$ is preferably provided, by means of which the bottle $a$ can be carried about during the service. The bottle $a$ is near its neck provided with a suitable connection $r$ of any known construction, to which some hose or the like can be attached for conducting the liquid when the latter is being forced out of the bottle $a$. A mantle $n$ slightly tapering downward is suspended from the cover $l$, so that it can pass through the neck $o$ of the bottle $a$. Near its lower open end the mantle $n$ is provided with suitable slots $q$, in which the trunnions $m$ of a ring or frame $k$ of any known construction can engage similar to a bayonet. Or the trunnions $m$ may be made to engage in the mantle $n$ in any known manner. The mantle $n$ is moreover provided with several large holes $w$ below and several small holes $v$ near the top of the bottle $a$ for purposes to be explained later on. An acid bottle $b$ of glass or the like is provided above its center of gravity with a globular thickening $h$ which fits in the ring or frame $k$, so that both parts form a ball-and-socket joint. At a convenient distance from the top of its neck $e$ the bottle $b$ is provided with an annular cup $c$. The stopper $g$ of glass or the like is globular at the upper end so that it in any position within certain limits is adapted to close the mouth of the neck $e$. The lower end of the stopper $g$ is pointed and made so long that it can not get out of the neck $e$, when the bottle $a$ is turned with its bottom upward and the upper end of the stopper $g$ bears on the inside of the cover $l$. The stopper $g$ is provided with a mantle $d$, which extends so much downward as to place in conjunction with the long pointed end $f$ the center of gravity of the stopper beneath the upper end of the neck $e$, so that the stopper $g$ by its own weight is caused to always close the mouth of the neck $e$. Preferably some play is left between the lower edge of the mantle $d$ and the bottom of the cup $c$. When the stopper $g$ is moved by some shock, it is always returned to its normal position, since every point in which the lower edge of its mantle $d$ touches the bottom of the cup $c$ will form a fulcrum around which the stopper $g$ is turned downward by its weight.

The fire-extinguisher described is operated as follows: The bottle $a$ is filled in the usual manner up to say a point near the bottom of the acid bottle $b$ or near the lower edge of the mantle $n$, either above or beneath the same, with water, to which an alkali, such as for example bicarbonate of soda, is added. The small bottle $b$ is filled up say to the center of its thickening $h$ with an acid, such as for example concentrated sulfuric acid, after which the stopper $g$ is put on the mouth of its neck $e$ and its trunnions $m$ are introduced into the bayonet slots $q$ or the like. Then the acid bottle $b$ is inserted together with the mantle $n$ in the bottle $a$ and the cover $l$ is screwed home to the neck $o$.

Normally the charged bottle $a$ is left or carried about in its vertical position shown. When during the transport the bottle $a$ is shaken, whereby at its top the water is agitated, the mantle $n$ will keep most of the splashing water off from the upper part of the acid bottle $b$. A small quantity of water may get through the small holes $v$ and if it drops from the cover $l$ on the stopper $g$, it will simply flow down the mantle $d$ into the cup $c$, from which any excess of it will flow over and run down the outside of the bottle $b$ without getting into the latter. It will be seen, that the mantle $d$ of the stopper $g$ forms with the cup $c$ an excellent water-seal.

When the fire-extinguisher is required to operate, it is inverted with the result, that the stopper $g$ drops on the cover $l$ and permits the acid to flow out of the bottle $b$, so that the acid mixes with the water and alkali flowing into the chamber within the mantle $n$ through its open end and its holes $w$ and $v$. Thereby carbonic acid is developed from the bicarbonate of soda, and it rises upward through the large holes $w$ and the open end of the mantle $n$ and produces a high pressure which forces the liquid out of the bottle $a$ through the connection $r$ and the respective hose or the like. During use the bottle $a$ may be carried about by means of its handle $s$.

It will be seen, that owing to the construction described of the fire-extinguisher normally no shocks will cause the acid to get out of the bottle $b$ and to mix with the contents of the large bottle $a$. Even if the latter is placed horizontally on the floor, the acid bottle $b$ will assume an inclined position such as to prevent the acid from flowing out. Of course the internal surfaces of the bottle $a$ and the surfaces of the mantle $n$ and the bottle $b$ require to be acid-proof or protected in any known manner from the action of the acid or other chemicals.

I am aware, that it is old to actuate fire-extinguishers by inverting them, also it is old to surround the acid bottle with a mantle and to provide the stopper with a guiding pointed end extending into the neck of the acid bottle, and at last it is old to arrange other stoppers to form water-seals. I therefore do not claim such features broadly, but I claim the special combination described of parts showing the said features, whereby a new technical effect is obtained. First of all it is characteristic of my invention, that the acid bottle is made to swing around a point above its center of gravity, whereby the advantage is obtained, that no vibrations or shocks will cause it to pour out its contents during the transport. Another new feature of my invention, which is of great importance, resides in the special shape and arrangement of the mantle $n$ for supporting the acid bottle $b$, it tapering downward from the cover or the mouth of the large bottle $a$ and forming so to say a special chamber for the gasification, whereby the greatest possible economy in the consumption of the acid and a separation of the extinguishing liquid from the acid is obtained, while the mantle $n$ protects the acid bottle from the splashing liquid when the fire-extinguisher is not used. A third feature of my invention is the universal joint by means of which the acid bottle is connected with the mantle, whereby all of the smaller vibrations of the fire-extinguisher during its transport by hand or otherwise are only permitted to influence the large bottle $a$ and not the acid bottle $b$. This is of special importance, since the acid bottle is covered only with a light stopper and is not tightly closed. The last feature of my invention is the special shape of the stopper for the acid bottle, which stopper is made to loosely rest on the edge of the neck while touching it only in a circle in opposition to other stoppers touching their seats in a broad plain or conical tightening surface. The stopper is therefore prevented from sticking fast. As explained above, the stopper $g$ by its special shape is rendered safe as it has the tendency to automatically resume its normal position in spite of all vibrations. The stopper $g$ moreover presents the important advantage of forming a water-seal as explained above, so that the acid is in an effective manner prevented from mixing with the contents of the large bottle $a$. Any water getting into the cup $c$ is not permitted to accumulate here, since its excess will always overflow, so that it is prevented from getting into the acid bottle $b$, seeing, that the cup $c$ is at a considerable distance beneath the mouth of the neck $e$.

The improved fire-extinguisher according to my invention therefore presents essential advantages over the old constructions. The mixing of the acid with the contents of the bottle $a$ is prevented with a certainty and the fire-extinguisher can be started only by inverting it, after it has been transported to the place of danger. No internal parts need be first broken or destroyed before the apparatus starts, as is the case with certain old fire-extinguishers, so that the apparatus is not spoiled by cracked parts or the like. Consequently the new fire-extinguisher can be put in order at any moment for service. At last the advantage deserves to be noted, that the water forced out of the fire-extinguisher is nearly free from acid.

The fire-extinguisher described may be varied without departing from the spirit of my invention.

I claim:

1. In a fire extinguisher, the combination of a bottle adapted to contain water and alkali, a cover adapted to serve as a base on which said bottle may be inverted, a mantle depending from said cover and open at its lower end, an acid bottle, and a universal pivot joint suspending said acid bottle above its center of gravity in the lower part of said mantle.

2. In a fire-extinguisher, the combination with a bottle adapted to contain water and alkali, of a cover adapted to be tightened and to serve as a base on said bottle being inverted, a mantle suspended from said cover and open at the lower end, an acid bottle having on its neck at a distance from the mouth an annular cup, a universal joint connecting said acid bottle above its center of gravity with the lower part of said mantle, and a globular stopper adapted to loosely rest on the mouth of said acid bottle and provided with a downward extension within and a mantle without the neck, this mantle forming with the annular cup a water-seal.

3. In a fire-extinguisher, the combination with a bottle adapted to contain water and alkali, of a cover adapted to be tightened and to serve as a base on said bottle being inverted, a mantle suspended from said cover, open at the lower end, provided with holes and adapted to serve as a gasification chamber, an acid bottle having on its neck at a distance from the mouth an annular cup, a universal joint connecting said acid bottle above its center of gravity with the lower part of said mantle, a globular stopper adapted to loosely rest on the mouth of said acid bottle and provided with a downward extension within and a mantle without the neck, this mantle forming with the annular cup a water-seal, and a connection on said bottle near said cover for the liquid to be forced out, said stopper being adapted to automatically return to its normal position in spite of vibrations and shocks and to open said acid bottle without getting out of its neck on said bottle being inverted.

ANDERS AMMENTORP.

Witnesses:
 ERNEST H. L. MUMMENHOFF,
 OTTO W. HELLMRICH.